Oct. 13, 1936.    F. O. DE MILLAR    2,057,088
FLUID PRESSURE CONTROLLING VALVE
Original Filed Feb. 20, 1933    2 Sheets—Sheet 1
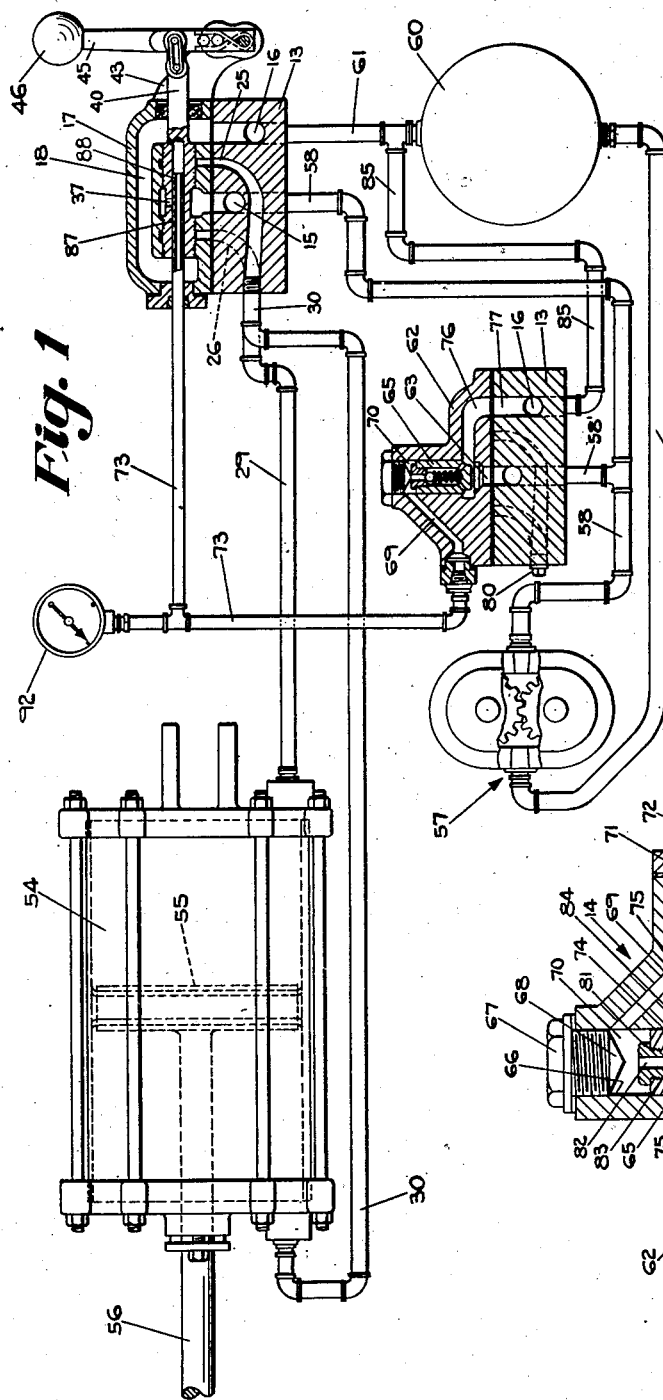
Fig. 1
Fig. 2
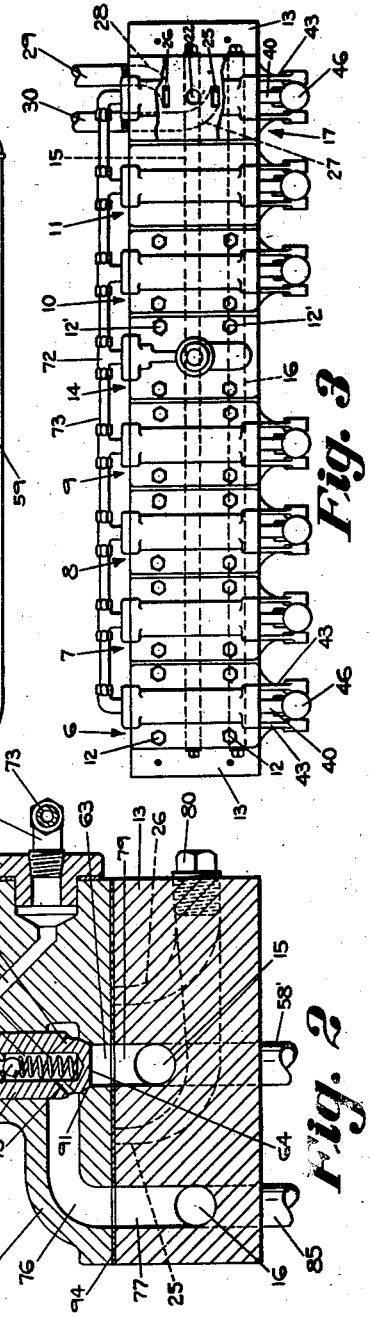
Fig. 3
INVENTOR:
Floyd O. DeMillar,
BY
Chas. M. Nissen,
ATT'Y.

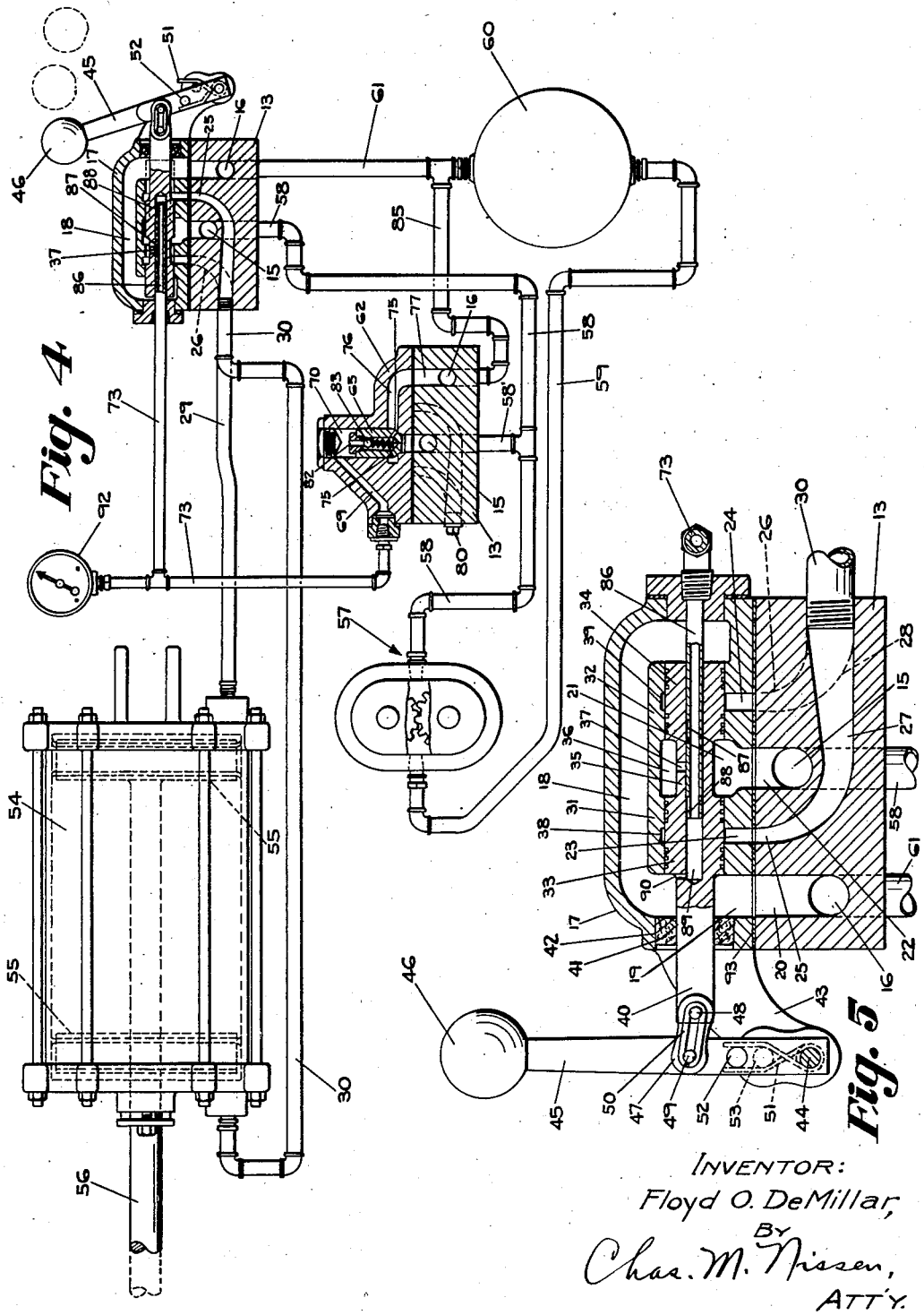

Patented Oct. 13, 1936

2,057,088

UNITED STATES PATENT OFFICE 2,057,088

FLUID PRESSURE CONTROLLING VALVE

Floyd O. De Millar, Granville, Ohio, assignor to The Galion Iron Works and Manufacturing Company, a corporation of Ohio Application February 20, 1933, Serial No. 657,665
Renewed August 15, 1936

13 Claims. (Cl. 121—46.5)

My invention relates to controlling apparatus for fluid-pressure motors and one of its objects is the provision of improved and efficient valve mechanism in such controlling apparatus.

Another object of the invention is the provision of valve mechanism particularly adapted for use in connection with a combined pressure relief and by-pass valve mechanism.

A further object of the invention is the provision of a manually operated valve structure for controlling double acting hydraulic motors in a fluid pressure controlling system including a continuously operating fluid pressure pump.

Other objects of the invention will appear hereinafter, the novel features and combinations being set forth in the appended claims.

In the accompanying drawings Fig. 1 is a view more or less diagrammatic of my improved pressure-controlling system embodying a combined by-pass and pressure relief valve operating automatically to limit the pressure in a fluid-pressure motor and to enable a pump to be operated at substantially no load when the motor is inactive;

Fig. 2 is an enlarged sectional elevation of my improved combined by-pass and pressure relief valve mechanism mounted on a manifold;

Fig. 3 is a plan view of a plurality of controlling valves combined with the combined by-pass and pressure relief valve mechanism and mounted on a manifold;

Fig. 4 is a view similar to Fig. 1 showing the positions of the parts when the motor reaches the limit of its stroke and the pump continues to be driven at substantially no load; and Fig. 5 is an enlarged sectional elevation of the manually operated controlling valve mounted on a manifold.

In Fig. 3, I have shown seven manually operated valves designated 6, 7, 8, 9, 10, 11 and 17, detachably mounted by means of the cap screws 12, 12 on the elongated manifold block 13. Also mounted on the manifold block is one combined by-pass and pressure relief valve mechanism designated 14. The manually operated valves are each of the same construction and shown in detail in the sectional elevational view of Fig. 5. The details of the combined by-pass and pressure relief valve mechanism 14 are shown in the sectional elevational view of Fig. 2.

The manifold block 13 is provided with a supply passageway 15 which extends almost the entire length of the manifold block 13 as shown in Fig. 3. Also extending almost the entire length of the manifold block 13 is the discharge passageway 16. The supply passageway 15 and the discharge passageway 16 are common to all of the manually operated valves and are also connected to the combined by-pass and pressure relief valve mechanism 14.

Inasmuch as all of the manually operated valves are alike, a description of the construction shown in Fig. 5 will be sufficient to explain the operation of the manifold and the connections thereto. Each manually operated valve comprises a housing 17 having a chamber 18 therein which extends from one end to the other and communicates by means of the port 19 with the port 20, the latter extending downwardly to the discharge passageway 16. It should be understood that each manual valve is provided with a port 19 so that when it is mounted on a manifold block it registers with the port 20 extending through the top of the manifold block. It will thus be seen that for seven manual valves there will be seven ports 20 and seven ports 19.

A port 21 in the bottom of the housing 17 registers with a port 22 in the top of the manifold block 13, the port 22 being in communication with the supply passageway 15. On opposite sides of the port 21 are ports 23 and 24 which respectively register with the ports 25 and 26 which communicate with the motor passageways 27 and 28 leading to the rear side of the manifold block 13 at one end thereof as shown in Fig. 3. Screw-threaded into the rear side of the manifold block are motor pipes 29 and 30 as shown in Fig. 3.

Mounted in the slide bearings 31, 32 within the housing 17 is a piston valve having two cylindrical sections 33 and 34 having a connection 35 between them of reduced diameter to afford an annular chamber 36 for transmission of fluid-pressure from the port 21 to the port 37. The ports 23 and 24 may be extended to annular chambers 38 and 39 as shown in Fig. 5.

A rod 40 is connected to the piston valve and mounted to slide in the bearing 41 which is preferably of composition material, circular in shape and having a water-tight fit with the opening 42 in the front end of the housing 17.

Extending forwardly from the housing 17 is a depending bracket 43 to which is pivoted at 44 a vertical lever 45 having an actuating knob 46 at its upper end.

A link 47 is pivoted at 48 to the outer end of the rod 40 and at 49 to the lever 45. A split loop 50 of spring metal is adapted to engage flat surfaces on the pins 48 and 49 to hold the link 47 connected to the rod 40 and the lever 45.

A spring 51 is associated with the pivot pin 44 and has two upstanding arms which engage opposite sides of the pins 52 and 53, the pin 52 being on the lever 45 and the pin 53 being fixed to the bracket 43. When the lever is moved to open the valve shown in Fig. 5 the spring 51 will be placed in tension as illustrated in Fig. 4 so that when the lever is released the spring will automatically return the valve to closed position as shown in Fig. 1.

The pipes 29 and 30 are adapted to be connected to the opposite ends of the cylinder 54 of a hydraulic motor with a piston 55 movable therein. The piston 55 is connected to a piston rod 56 and the latter in turn is connected to the mechanism to be adjusted and locked in adjusted position.

A hydraulic pump 57 is connected by the supply pipe 58 to the supply passageway 15 in the manifold 13. The suction pipe 59 is connected between the pump 57 and the supply tank 60 for the pressure medium such as oil. A discharge pipe 61 connects the discharge passageway 16 in the manifold with the supply tank 60.

When the lever 45 is pushed toward the housing 17 the annular chamber 21 is connected between the supply port 22 and the motor port 26. That is to say, the connector 35 of reduced diameter is moved to such a position that communication is established between the ports 21 and 24 while the piston section 34 keeps closed the right-hand opening in the cylindrical bearing 32. At the same time that the ports 21 and 24 are connected, the movement of the left-hand piston section 33 toward the right as viewed in Fig. 5 will establish communication between the port 23 and the port 19. It should be understood that the right-hand piston section 34 may abut against the inner wall of the housing 17 to enable the operator to be assured that when he moves the lever 45 toward the housing 17 as far as it will go, the ports 23 and 24 will be completely and accurately opened so that operation of the hydraulic motor may be commenced in a minimum space of time by having full power applied thereto immediately after the manual valve is opened.

The same is true when the valve is moved in the opposite direction when the bearing 41 will act as an abutment to accurately limit the left-hand movement of the piston valve to a position where the ports 23 and 24 will be completely opened. When the piston valve is moved toward the left as viewed in Fig. 5 the supply port 21 will be connected to the motor port 23 and the flow of the pressure medium through the pipes 29 and 30 will thus be reversed and the movement of the piston 55 in the cylinder 54 will be reversed.

Whenever the lever 45 of any manual valve is released its centering springs will automatically move the valve to closed position as shown in Fig. 1. A hydraulic motor connected to the manual valve will be locked in adjusted position whenever the valve is in central and closed position. For instance, in Fig. 1 the piston 55 is midway between the ends of the cylinder 54 where it is locked against movement in either direction by the closure of the manual valve because when the latter is closed the two piston sections 33 and 34 close the ports 23 and 24 and lock the liquid in the pipes 29 and 30 and in the cylinder 54.

The combined by-pass and pressure relief valve mechanism 14 is detachably mounted by means of the cap screws 12', 12' to the central portion of the manifold block 13 as shown in Fig. 3. The combined by-pass and pressure relief valve mechanism 14 as shown in Fig. 2 comprises a housing 62 having therein a port 63 which is controlled by the lower end 64 of a vertical piston valve 65 movable vertically in the cylinder 66. This cylinder 66 is closed at its upper end by the removable screw cap 67 having a lower conical end 68 acting as an abutment to limit the upward travel of the piston valve 65 as shown in Fig. 1. The housing 62 is also provided with a passageway 69 which connects the chamber 70 at the upper end of the cylinder 66 through the connecting device 71 to the T-coupling 72, the latter being connected to the pipe 73 which in turn is connected to all of the manually operated valves as shown in Figs. 3 and 5.

As shown in Fig. 2 a central vertical bore or passageway 74 in the piston valve 65 communicates through the ports 75, 75 with the passageway 76 in the front portion of the housing 62 as illustrated in Fig. 2. The passageway 76 communicates with a port 77 in the top of the manifold block 13 and this port is connected to the discharge passageway 16 in the manifold block 13. The manifold block is also provided in its upper side with a port 79 which registers with the port 63. The combined by-pass and pressure relief valve mechanism may be placed at any position on the manifold block which is constructed to receive any of the manually operated valves. When the combined by-pass and pressure relief valve mechanism is mounted in a selected position, the passageways 25 and 26 are closed by means of screw plugs, one of which is illustrated at 80 in Fig. 2.

Screw-threaded into the top of the piston valve 65 is an auxiliary valve element 81 which is provided with a central vertical opening 82, the lower end of which is adapted to be closed by means of the ball 83 below which is mounted a spring 84. Inasmuch as the bore 74 does not extend through the bottom 64 of the piston valve 65 an elongated cup is provided for the spring 84. This spring therefore is able to urge the ball valve 83 to closed position and hold it closed during operation of the hydraulic motor comprising the cylinder 54.

The operation of the combined by-pass and pressure relief valve mechanism may be understood by following in sequence the various steps in effecting the start and stopping of the hydraulic motor comprising the cylinder 54 and the piston 55. When the manual valve is in closed position as shown in Fig. 1 the low pressure in the supply pipe 58 and the branch pipe 58' will be sufficient to hold the piston valve 65 in its open position as shown in Fig. 1. The pump 57 may be continuously operated while the hydraulic motor is inactive and the manual valve closed and during such time liquid will flow through the port 63 into the passageway 76 and thence through the port 77 in the manifold, the discharge passageway 16 therein and thence through the discharge pipe 85 into the tank 60. The suction side of the pump 57 is connected by means of the pipe 59 to the tank 60.

When the manual valve is moved to its open position as shown in Fig. 4 a branch low pressure connection is established between the supply pipe at 58 and the chamber 70 in the upper end of the cylinder 66 of the combined by-pass and pressure relief valve mechanism. By referring to Fig. 5 it will be seen that a stationary pipe 86 is connected to pipes 73 communicating with the passageway 69 in the combined by-pass and pressure relief valve mechanism. So long as the manual valve is closed the port 37 is closed, but when the manual valve is moved to open position the port 37 registers with either the port 87 or the port 88 in the stationary tube 86. The left-hand end of the tube 86 is open and extends into the central bore 89 of the piston valve and a small restricted opening 90 connects the bore 89 with the chamber 18. The restricted opening 90 prevents locking of the lever 45 by enabling the latter to be moved in either direction at any time irrespective of the confinement of liquid in the pipes 73, passageway 69 and chamber 70.

When the manual valve is moved to its open position shown in Fig. 4 the supply pipe 58 is connected through the port 37 with the port 87 and therefore a low pressure connection is established to the chamber 70 above the piston valve 65. When this occurs the valve 65 is still in its open position as shown in Fig. 1, but the hydraulic pressure after opening of the manual valve being exerted with substantially equal force at both ends of the piston valve 65, the latter will be able to drop by gravity, or if the forces acting on the ends of the piston valve 65 should be unequal the weight of the valve will nevertheless be sufficient to cause the same to move downwardly to its closed position as shown in Fig. 4.

By referring to Fig. 2 it will be seen that the lower end 64 of the piston valve 65 is of less cross-sectional area than the cross-sectional area of the cylinder 66. The annular seat 91 surrounds the port 63 which is of the same cross-sectional area as the lower end 64 of the valve 65. Therefore if the valve is closed as shown in Figs. 2 and 4 the pressure on the top will be greater than the pressure exerted on the lower end 64. The low pressure passageway 76 being closed the flow through the low pressure pipes 58' and 85 will be discontinued and the continued operation of the pump 57 will build up sufficient pressure to cause the liquid to be forced into the pipe 29 at the right-hand end of the cylinder 54 as viewed in Fig. 4. The piston 55 will therefore be moved toward the left and the liquid at the left of the piston 55 will flow through the pipe 30 into the discharge pipe 61 and thence into the tank 60. During the movement of the piston 55 pressure will be exerted through the pipes 73 and passageway 69 to hold the valve 65 in its closed position shown in Figs. 2 and 4.

When the piston 55 reaches the end of its stroke and the manual valve still remains in its open position shown in Fig. 4 the pump 57 may continue to operate because the ball check valve 83 limits the pressure in the cylinder 54. When the pressure exceeds the predetermined limit the check valve 83 will be lowered against the spring 84 and liquid will be by-passed through the center of the valve 65 and the ports 75 into the passageway 76 to the pipe 85 and thence into the tank 60.

As soon as the manual valve is closed the port 37 will be closed and consequently the continually operating pump 57 can supply the liquid in the pipe 58 to no other passageway than that designated 76. An impulsive force will therefore be exerted on the lower end 64 of the valve 65 to move the latter upwardly to its position shown in Fig. 1. If the ball check valve 83 happens to be closed at the time such impulsive force is exerted the confinement of the liquid in the pipes 73, passageway 69, and the chamber 70 will effect opening of the check valve while the piston valve 65 is being moved to its upper position shown in Fig. 1, whereupon said check valve will automatically close and the relatively low pressure from the pump will hold the valve 65 in its upper position while the pump continues to be driven at substantially no load or at very low pressure, thereby economizing in the consumption of fuel of the engine or other motive power used for driving the pump 57.

A pressure gauge 92 may be connected to the pipes 73 as shown in Figs. 1 and 4, so that whenever the manual valve is open the operator may determine by observing the pressure gauge whether the pump 57 is operating properly or the check valve is opening at the predetermined pressure.

It should be understood that the supply pipe 58 and the connections between the same and the hydraulic motors through the manually operated valves and the connections to the top of the combined by-pass and pressure relief valve mechanism should always be completely filled with liquid so that the combined by-pass and pressure relief valve mechanism will act very quickly upon the opening of the manual valve to secure quick starting of the hydraulic motor to which such operated manual valve is connected. To assure such complete filling of the connections with liquid the manifold is provided with sealing gaskets 93 and 94 between the housings of the manual valves and the manifold 13 and between the housing of the combined by-pass and pressure relief valve mechanism and the manifold 13. Whenever a manual valve is moved to one open position or another, the ports 23 and 24 will be completely opened and when the knob 46 is released the centering springs will move the piston sections 33 and 34 so as to occupy the position shown in Fig. 5, which positions are symmetrical with respect to the ports 23 and 24, thereby assuring that the piston 55 of the corresponding hydraulic motor will be locked in adjusted position.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In valve mechanism, the combination with a slide valve, of a stationary tube extending into said valve and supporting the same, a housing for said valve provided with a supply port, and means for moving said valve into position to establish communication between said supply port and the interior of said tube through ports in said valve and in said tube.

2. In valve mechanism, the combination with a sliding valve, of a slide bearing therefor, a housing having a supply port and a discharge port, a tube extending into a bore in said valve, said bore being in communication through a restricted bleed port with the discharge port to facilitate free movement of said valve in either direction, and means to actuate said valve to connect said supply port with the interior of said tube through registering ports in said valve and said tube.

3. In valve mechanism, the combination with a piston valve having two sections, of slide bearings for said sections, a housing having a supply port in communication with a chamber between said sections and a port extending diametrically through the connection between said sections, a stationary pipe having an inner open end and extending into a central bore in said valve, said stationary pipe having spaced-apart ports adapted to register with said port in said connection when said valve is in its open positions, said housing having a chamber extending from end to end outside of said bearings and in communication with a discharge port, said housing also having motor ports spaced from said supply port and on opposite sides thereof, and means for sliding said valve in its bearings to connect said supply port to either of said motor ports and to connect the other motor port to the discharge port while at the same time said supply port is connected to the interior of said stationary pipe, a restricted port being always between said bore and said discharge chamber in said housing to facilitate movement of said sliding means when said stationary pipe is closed at its outer end.

4. In valve mechanism, the combination with a housing, of a piston valve having a port therein and slide bearings therefor within the housing, a stationary pipe having an inner open end and extending into a central bore in the said valve, the stationary pipe having spaced-apart ports adapted to register with the port in the valve when the valve is in its open positions.

5. In valve mechanism, the combination with a housing, of a piston valve having two sections with a connection therebetween, slide bearings for the sections, the housing having a supply port in communication with a chamber between the sections and a port extending diametrically through the connection between the sections, the housing having a chamber extending from end to end outside of the said bearings and in communication with a discharge port, and mechanism for actuating the piston valve element for controlling the ports.

6. In valve mechanism, the combination with a housing, of a piston valve having two sections with a connection therebetween, slide bearings for the sections, the said housing having a supply port in communication with a chamber between the sections and a port extending diametrically through the connection between the sections, a stationary pipe having an inner open end and extending into a central bore in the said valve, the stationary pipe having spaced-apart ports adapted to register with the port in the said connection when the valve is in its open positions, the said housing having a chamber extending from end to end outside of the bearings and in communication with a discharge port, the said housing also having motor ports spaced from the said supply port and on opposite sides thereof, and mechanism for operating the said valve to connect the supply port to either of the motor ports and to connect the other motor port to the discharge port while at the same time the supply port is connected to the interior of the stationary pipe.

7. In valve mechanism, the combination with a housing, of a piston valve having two sections with a connection therebetween, slide bearings for the sections, the housing having a supply port in communication with a chamber between the said sections and a port extending diametrically through the connection between the sections, a stationary pipe having an inner open end and extending into a central bore in the said valve, the stationary pipe having spaced-apart ports adapted to register with the port in the said connection when the valve is in its open positions, the housing having a chamber extending from end to end outside of the said bearings and in communication with a discharge port, the said housing also having motor ports spaced from the supply port and on opposite sides thereof, means for sliding the valve in its bearings to connect the supply port to either of the motor ports and to connect the other motor port to the discharge port while at the same time the supply port is connected to the interior of the stationary pipe, a restricted port being always between the said bore and the said discharge chamber in the housing to facilitate movement of the said valve sliding means when the stationary pipe is closed at its outer end, and means for automatically centering the said piston valve relatively to the bearings upon release of the valve.

8. In valve mechanism, the combination with a housing, of a piston valve having two sections with a connection therebetween, slide bearings for the sections, the housing having a supply port in communication with a chamber between the said sections and a port extending diametrically through the connection between the sections, an actuating lever pivotally mounted on the housing, a piston rod connected to the piston valve and extending exteriorly of the housing, a link connecting the outer end of the piston rod to the lever, a stationary pipe having an inner open end and extending into a central bore in the said valve, the said stationary pipe having spaced-apart ports adapted to register with said port in the connection when the valve is in its open positions, the housing having a chamber extending from end to end outside of the said bearings and in communication with a discharge port, the said housing also having motor ports spaced from the said supply port and on opposite sides thereof, the said actuating lever and rod forming means for sliding the valve in its bearings to connect the supply port to either of the motor ports and to connect the other motor port to the discharge port while at the same time the supply port is connected to the interior of the stationary pipe, a restricted port being always between the said bore and the said discharge chamber in the housing to facilitate movement of the sliding means when the said stationary pipe is closed at its outer end, and spring actuated mechanism for centering the valve relatively to its bearings when the said lever is released.

9. In valve mechanism, the combination with a valve device comprising a housing provided with a plurality of ports, of a movable valve element for controlling the ports, the said valve element being provided with a bore and also with a port extending through the valve element to the said bore, a stationary tube extending into the said bore and provided with spaced ports adapted to be selectively engaged with the valve port as the valve is operated for enabling a certain quantity of fluid to pass through the said tube, and means for preventing locking of the valve.

10. In valve mechanism, the combination with a housing, of an open-ended bearing within the housing and spaced therefrom, a sliding valve mounted in the bearing and adapted to operate therethrough, the said housing being provided with an intake port, an outlet port and motor ports controlled by the said valve, a stationary pipe extending into the valve and provided with a plurality of ports adapted to be selectively engaged with the said intake port when the valve is in predetermined positions for enabling a certain quantity of liquid entering the housing to be by-passed through the pipe, and means for actuating the valve.

11. In valve mechanism, the combination with a piston valve adapted to effect operation of a fluid pressure motor and a by-pass valve mechanism, of a slide bearing for the exterior of the piston valve, and defining an annular fluid intake chamber with the valve, the said valve being provided with a port communicating with the said intake chamber, a fixed tubular slide bearing for the interior of the valve and provided with ports adapted to be brought into communication with the port in the valve responsively to movements of the piston valve, means interconnecting the tubular slide bearing with the by-pass valve mechanism, a housing for enclosing the valve and bearings and affording a plurality of ports controlled by the valve, one of which ports is a fluid intake port, the remaining ports being connected with the fluid motor and with the pressure relief mechanism, respectively, whereby upon moving the slide valve to open position communication is afforded between the intake port and passageway and the fluid motor and when the said slide valve is moved to closed position the communication is cut off and communication established between the intake port and by-pass valve mechanism.

12. In valve mechanism, the combination with a piston valve adapted to effect operation of a fluid pressure motor and a by-pass valve mechanism, of a slide bearing for the exterior of the piston valve and defining an annular fluid intake chamber with the valve, the said valve being provided with a port communicating with the intake chamber, a fixed tubular slide bearing for the interior of the valve, and provided with ports adapted to be brought into communication with the port in the valve responsively to movements of the piston valve, a housing for enclosing the valve and bearings and defining a plurality of ports including a fluid intake port and an outlet port, the housing having a passageway communicating with the outlet port and extending from end to end of the housing around the slide bearing for the exterior of the piston valve, the housing also defining additional ports controlled by the said valve, means connecting these additional ports with the fluid pressure motor, one of the said ports being intermediate the intake port and outlet port, the other of the said ports being intermediate the intake port and end of the said passageway around the slide bearing whereby the said ports are selectively placed in communication between the intake and outlet ports responsively to movements of the slide valve, thereby enabling circulation of fluid through the fluid pressure motor selectively through either end thereof, and means interconnecting the said fixed tubular slide bearing with the by-pass valve mechanism.

13. In a valve mechanism, the combination with a piston valve adapted to effect operation of a fluid pressure motor and by-pass mechanism, of a slide bearing for the exterior of said valve and defining an annular fluid chamber with the valve, a fixed tubular slide bearing extending into the interior of said valve for communication with the by-pass mechanism, and a housing for enclosing said valve and bearings and affording motor controlling ports controlled by said valve, one of which ports is an intake port, the said tubular bearing being provided with a plurality of ports disposed to register selectively with a port in the valve for affording communication between the intake port and the interior of the tubular slide bearing for effecting operation of said by-pass mechanism.

FLOYD O. DE MILLAR.